United States Patent
Kurokawa et al.

(10) Patent No.: US 11,062,852 B2
(45) Date of Patent: Jul. 13, 2021

(54) SOLID ELECTROLYTIC CAPACITOR HAVING AN ANODE TERMINAL AND A CATHODE TERMINAL FORMED FROM A SINGLE METAL PLATE AND METHOD FOR MANUFACTURING SAME

(71) Applicant: Panasonic Intellectual Property Management Co., Ltd., Osaka (JP)

(72) Inventors: Akinari Kurokawa, Saga (JP); Norihiko Ogata, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/568,249

(22) Filed: Sep. 12, 2019

(65) Prior Publication Data

US 2020/0006008 A1 Jan. 2, 2020

Related U.S. Application Data

(63) Continuation of application No. PCT/JP2018/009613, filed on Mar. 13, 2018.

(30) Foreign Application Priority Data

Mar. 29, 2017 (JP) .............................. JP2017-065868

(51) Int. Cl.
*H01G 9/012* (2006.01)
*H01G 9/15* (2006.01)
(Continued)

(52) U.S. Cl.
CPC ............. *H01G 9/012* (2013.01); *H01G 9/025* (2013.01); *H01G 9/052* (2013.01); *H01G 9/07* (2013.01); *H01G 9/15* (2013.01)

(58) Field of Classification Search
CPC ........ H01G 9/012; H01G 9/025; H01G 9/052; H01G 9/07; H01G 9/15; H01G 9/0032; H01G 9/0036
See application file for complete search history.

(56) References Cited

U.S. PATENT DOCUMENTS 6,493,214 B1 * 12/2002 Kanetake ............... H01G 9/012
361/531
8,614,880 B2 * 12/2013 Naito ..................... H01G 9/012
361/540

(Continued)

FOREIGN PATENT DOCUMENTS

CN 101452764 A 6/2009
CN 103137336 A 6/2013
(Continued)

OTHER PUBLICATIONS

International Search Report of PCT application No. PCT/JP2018/009613 dated May 29, 2018.
(Continued)

*Primary Examiner* — David M Sinclair
(74) *Attorney, Agent, or Firm* — McDermott Will and Emery LLP

(57) ABSTRACT

A solid electrolytic capacitor includes a porous sintered body, a metal lead, a dielectric layer, a solid electrolyte layer, a first terminal, and a second terminal. The porous sintered body has a pair of main faces opposed to each other, a pair of side faces opposed to each other, and a pair of end faces opposed to each other. The metal lead is extended from one of the pair of main faces. The first terminal includes a first terminal mounting part extending in substantially parallel to each of the pair of side faces, and a pair of arm parts extending in substantially parallel to each of the pair of end faces. The pair of arm parts are opposed to each other. The second terminal includes a terminal connecting part electri- (Continued)

cally connected to the solid electrolyte layer. The metal lead is electrically connected to each of the pair of arm parts.

8 Claims, 12 Drawing Sheets

(51) Int. Cl.
*H01G 9/025* (2006.01)
*H01G 9/052* (2006.01)
*H01G 9/07* (2006.01)

(56) References Cited

U.S. PATENT DOCUMENTS

| | | |
|---|---|---|
| 2004/0165338 A1 | 8/2004 | Arai et al. |
| 2008/0148541 A1* | 6/2008 | Nishimura ............... H01G 9/07 29/25.03 |
| 2009/0147447 A1 | 6/2009 | Matsuoka et al. |
| 2010/0214038 A1* | 8/2010 | Kurita ...................... H01G 9/15 333/185 |
| 2013/0135791 A1 | 5/2013 | Fujii et al. |

FOREIGN PATENT DOCUMENTS

| | | | | |
|---|---|---|---|---|
| DE | 3931244 A1 | * | 3/1991 | ............. H01G 9/012 |
| JP | 03188614 A | * | 8/1991 | ............. H01G 9/012 |
| JP | 10-106889 | | 4/1998 | |
| JP | 2003045756 A | * | 2/2003 | |
| JP | 2004-253615 | | 9/2004 | |
| JP | 2004-311976 | | 11/2004 | |
| JP | 2009-141209 | | 6/2009 | |
| JP | 2009130155 A | * | 6/2009 | ............. H01G 9/012 |
| JP | 2009-200369 | | 9/2009 | |
| JP | 2014-204059 | | 10/2014 | |

OTHER PUBLICATIONS

English Translation of Chinese Office Action dated Nov. 30, 2020 for the related Chinese Patent Application No. 201880019532.6.

* cited by examiner

Prior Art

SOLID ELECTROLYTIC CAPACITOR HAVING AN ANODE TERMINAL AND A CATHODE TERMINAL FORMED FROM A SINGLE METAL PLATE AND METHOD FOR MANUFACTURING SAME

RELATED APPLICATIONS

This application is a continuation of the PCT International Application No. PCT/JP2018/009613 filed on Mar. 13, 2018, which claims the benefit of foreign priority of Japanese patent application No. 2017-065868 filed on Mar. 29, 2017, the contents all of which are incorporated herein by reference.

BACKGROUND

1. Technical Field

The present disclosure relates to a solid electrolytic capacitor and a method for manufacturing the same, and specifically to a solid electrolytic capacitor having an anode terminal and a cathode terminal which are formed from a single metal plate, and a method for manufacturing the same.

2. Description of the Related Art

In recent years, a compact and large-capacitance capacitor for high frequency applications has been demanded along with downsizing and lightening of electronic devices. Many solid electrolytic capacitors having low equivalent series resistance (ESR) and superior frequency characteristics have been proposed so far. The solid electrolytic capacitors generally include a capacitor element, a resin outer body enclosing the capacitor element, and an anode terminal and a cathode terminal electrically connected to the capacitor element and exposed outside the resin outer body. The capacitor element includes an anode body in which a metal lead electrically connected to the anode terminal is partly embedded, a dielectric layer disposed on a surface of the anode body, and a solid electrolyte layer disposed on a surface of the dielectric layer. The anode body is constituted by a porous sintered body formed by sintering particles of valve metal such as tantalum, niobium, or titanium.

For example, Unexamined Japanese Patent Publication No. 2014-204059 states that a distal end of an anode connecting part formed by subjecting a frame to bending processing is electrically connected to a metal lead of a capacitor element. Generally, an electrostatic capacity, which mainly depends on an outer size (in particular, thickness), of a capacitor element built in a solid electrolytic capacitor largely differs in accordance with electrical specifications required by user. Accordingly, the anode connecting part described in Unexamined Japanese Patent Publication No. 2014-204059 needs to be changed in its outer size in accordance with a required thickness to obtain demanded electrostatic capacity. However, when an outer size of an anode terminal and a cathode terminal used is changed to match according to the different outer size of the capacitor element, a punching die for manufacturing the anode terminal and the cathode terminal needs to be individually produced. This causes a manufacturing cost increase. Also, when a plurality of capacitor elements is laminated and thereafter enclosed in a resin outer body to obtain a required electrostatic capacity, designing and processing the anode terminal and the cathode terminal in accordance with increased thickness inhibits improvement of productivity.

Unexamined Japanese Patent Publication No. 2004-253615 states that, in a solid electrolytic capacitor in which a plurality of capacitor elements is laminated, a plurality of anode leads extended in parallel from respective capacitor elements are laser welded or resistance welded to a side surface of an anode connection piece having an L character shape, which is welded to an anode terminal in the solid electrolytic capacitor. In this context, the anode lead needs to be in contact with the anode connection piece, so that the welding is performed in a state where the anode connection piece is pressed toward the anode lead. FIGS. 10A and 10B each illustrate a plan view of capacitor element 110 (including anode lead 102) and anode connection piece 107 described in Unexamined Japanese Patent Publication No. 2004-253615 viewed from above. FIG. 10A illustrates a case where anode connection piece 107 is welded in a state where anode connection piece 107 is pressed with appropriate pressure F1 toward anode lead 102. FIG. 10B illustrates a case where anode connection piece 107 is welded in a state where anode connection piece 107 is pressed with excessive pressure F2 toward anode lead 102. This case includes a case where, for example, an embedded position of anode lead 102 with respect to capacitor element 110 is varied to make anode lead 102 be disposed at a slightly deviated position with respect to a center of anode connection piece 107. As is shown in FIG. 10B, anode lead 102 is largely bent even when anode connection piece 107 is disposed at a slightly deviated position with respect to anode lead 102. In this context, a large stress occurs at a portion of anode lead 102 that is projected from capacitor element 110 (that is, a root of anode lead 102), which may disadvantageously generate a crack in capacitor element 110.

Unexamined Japanese Patent Publication No. 2009-200369 states that an anode wire is in contact with a rising part and a bent part of an anode lead frame to increase a contact area. This configuration strengthens connection between the anode wire and the anode lead frame, and reduce equivalent series resistance (ESR) of a solid electrolytic capacitor. However, since the anode wire described in Unexamined Japanese Patent Publication No. 2009-200369 needs to be made contact with the rising part and the bent part of the anode lead frame, the rising part and the bent part of the anode lead frame need to be processed in accordance with a different external size of a capacitor element or the anode wire as described above as to Unexamined Japanese Patent Publication No. 2014-204059. This causes a manufacturing cost increase.

SUMMARY

A solid electrolytic capacitor according to a first aspect of the present disclosure includes at least one porous sintered body, a metal lead, a dielectric layer disposed on a surface of the at least one porous sintered body, a solid electrolyte layer disposed on the dielectric layer, a first terminal electrically connected to the metal lead, and a second terminal electrically connected to the solid electrolyte layer. The at least one porous sintered body has a pair of main faces opposed to each other, a pair of side faces opposed to each other, and a pair of end faces opposed to each other. The metal lead is partly embedded in the at least one porous sintered body and extends from one of the pair of main faces. The first terminal includes a first terminal mounting part extending in substantially parallel to each of the pair of side faces, a pair of arm parts extending in substantially parallel to each of the pair of end faces, and a bent part disposed between the first terminal mounting part and the pair of arm parts. The pair of arm parts are opposed to each other. The second terminal includes a terminal connecting part electrically connected to the solid electrolyte layer and a second terminal mounting part extending in substantially parallel to each of the pair of side faces. The metal lead is electrically connected to each of the pair of arm parts.

A solid electrolytic capacitor according to a second aspect of the present disclosure includes at least one porous sintered body, a metal lead, a dielectric layer disposed on a surface of the at least one porous sintered body, a solid electrolyte layer disposed on the dielectric layer, a first terminal electrically connected to the metal lead, and a second terminal electrically connected to the solid electrolyte layer. The at least one porous sintered body has a pair of main faces opposed to each other, a pair of side faces opposed to each other, and a pair of end faces opposed to each other. The metal lead is partly embedded in the at least one porous sintered body and extends from one of the pair of main faces. The first terminal includes a first terminal mounting part extending in substantially parallel to each of the pair of side faces, and a standing part having a slot. The slot extends in substantially parallel to each of the pair of main faces. The second terminal includes a terminal connecting part electrically connected to the solid electrolyte layer, and a second terminal mounting part extending in substantially parallel to each of the pair of side faces. The metal lead is electrically connected to each of a pair of connection surfaces of the slot. The pair of connection surfaces are opposed to each other.

A method for manufacturing a solid electrolytic capacitor according to a third aspect of the present disclosure includes following first to fifth steps. In the first step, a capacitor element is formed. The capacitor element includes at least one porous sintered body, a metal lead partly embedded in the at least one porous sintered body, a dielectric layer disposed on a surface of the at least one porous sintered body, and a solid electrolyte layer disposed on the dielectric layer. The at least one porous sintered body has a pair of main faces opposed to each other, a pair of side faces opposed to each other, and a pair of end faces opposed to each other. The metal lead extends from one of the pair of main faces. In the second process, a first terminal metal plate and a second terminal metal plate are formed from a single metal plate. In the third process, a first terminal is formed from the first terminal metal plate. The first terminal includes a first terminal mounting part extending in substantially parallel to each of the pair of side faces, a pair of arm parts extending in substantially parallel to each of the pair of end faces, and a bent part disposed between the first terminal mounting part and the pair of arm parts. The pair of arm parts are opposed to each other. In the fourth process, a second terminal is formed from the second terminal metal plate. The second terminal includes a terminal connecting part electrically connected to the solid electrolyte layer, and a second terminal mounting part extending in substantially parallel to each of the pair of side faces. In the fifth step, the metal lead is connected to each of the pair of arm parts in a state where the metal lead is sandwiched between the pair of arm parts.

A method for manufacturing a solid electrolytic capacitor according to a fourth aspect of the present disclosure includes following first to fifth steps. In the first step, a capacitor element is formed. The capacitor element includes at least one porous sintered body, a metal lead partly embedded in the at least one porous sintered body, a dielectric layer disposed on a surface of the at least one porous sintered body, and a solid electrolyte layer disposed on the dielectric layer, the at least one porous sintered body has a pair of main faces opposed to each other, a pair of side faces opposed to each other, and a pair of end faces opposed to each other. The metal lead extends from one of the pair of main faces. In the second step, a first terminal metal plate and a second terminal metal plate are formed from a single metal plate. In the third step, a first terminal is formed from the first terminal metal plate. The first terminal includes a first terminal mounting part extending in substantially parallel to each of the pair of side faces, and a standing part having a slot. The slot extends in substantially parallel to each of the pair of main faces. In the fourth step, a second terminal is formed from the second terminal metal plate. The second terminal includes a terminal connecting part electrically connected to the solid electrolyte layer, and a second terminal mounting part extending in substantially parallel to each of the pair of side faces. In the fifth step, the metal lead is electrically connected to each of a pair of connection surfaces of the slot in a state where the metal lead is sandwiched between the pair of connection surfaces of the slot. The pair of connection surfaces are opposed to each other.

The aspects of the present disclosure can provide high versatility, productivity, and reliability to a solid electrolytic capacitor including an anode terminal and a cathode terminal applicable to capacitor elements having various thicknesses and to a plurality of capacitor elements laminated, and a method for manufacturing the solid electrolytic capacitor.

DETAILED DESCRIPTION OF EMBODIMENT

Figure 1:
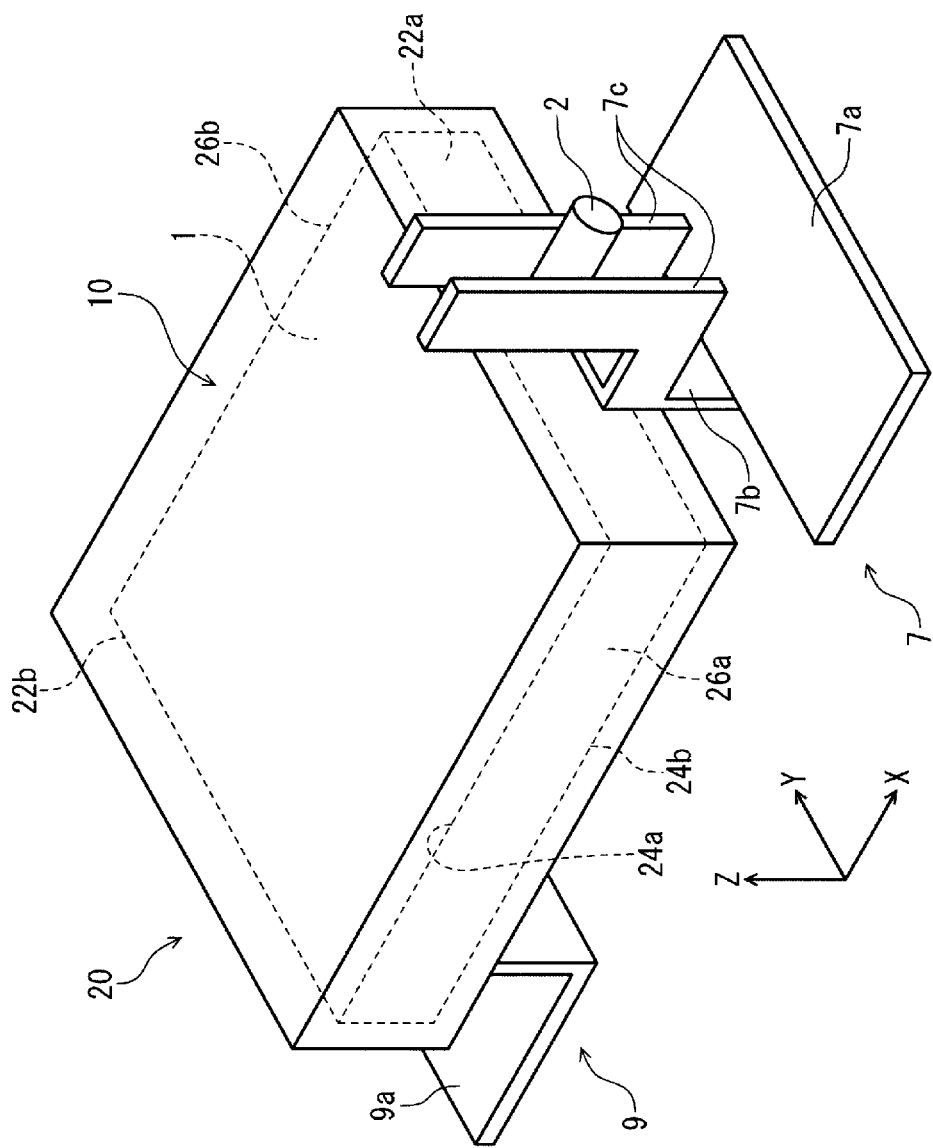
FIG. 1 is a perspective view illustrating a solid electrolytic capacitor (resin outer body is omitted) according to a first exemplary embodiment of the present disclosure.

Aspects of the present disclosure provides high versatility, productivity, and reliability to a solid electrolytic capacitor including an anode terminal and a cathode terminal applicable to capacitor elements having various thicknesses and to a plurality of capacitor elements laminated, and a method for manufacturing the solid electrolytic capacitor.

Hereinafter, exemplary embodiments of a solid electrolytic capacitor according to the present disclosure will be described below with reference to the accompanying drawings. In each exemplary embodiment, although terms for illustrating direction (e.g., "upper-lower", "left-right", "front-rear", "X, Y, Z") are used as appropriate for easy understanding, the terms are used for description and do not limit the present disclosure. Not that, in each drawing, in order to clarify shape or characteristic of each constituent element of the solid electrolytic capacitor, their sizes are relatively illustrated in the drawings, so that they are not necessarily illustrated with same scale ratio.

First Exemplary Embodiment

<Solid Electrolytic Capacitor>

Figure 2A:
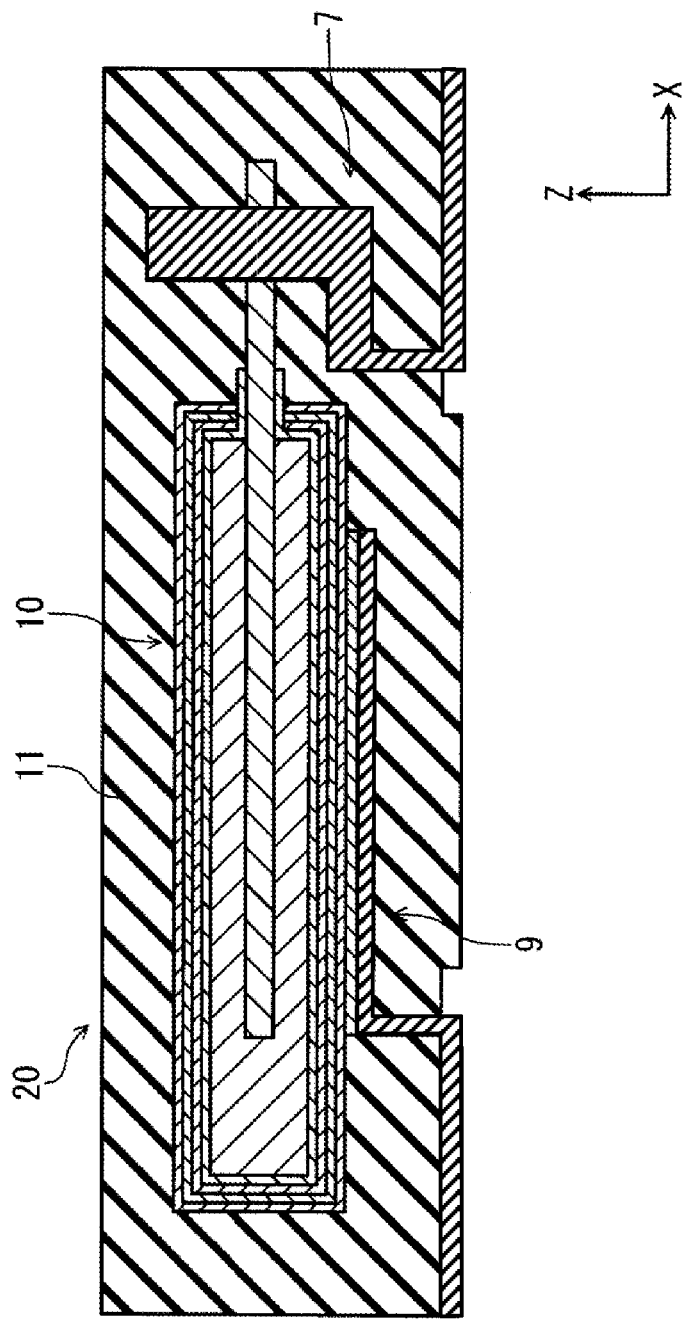
FIG. 2A is a cross-sectional view illustrating a solid electrolytic capacitor having a capacitor element having a small thickness.
Figure 2B:
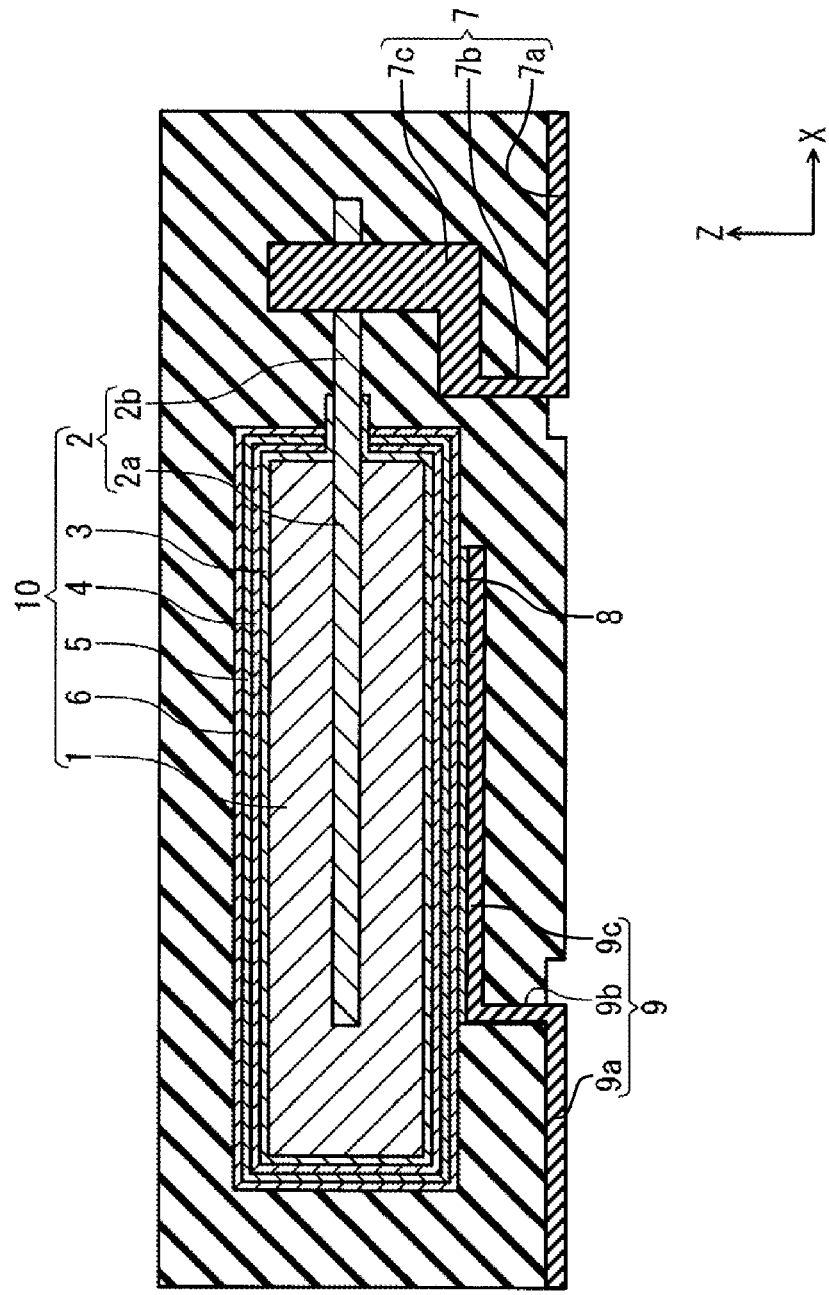
FIG. 2B is a cross-sectional view illustrating a solid electrolytic capacitor having a capacitor element having a large thickness.

A solid electrolytic capacitor according to a first exemplary embodiment of the present disclosure will be described below with reference to FIG. 1 to FIG. 5. FIG. 1 is a perspective view illustrating solid electrolytic capacitor 20 including capacitor element 10 including porous sintered body (anode body) 1, metal lead 2 buried in porous sintered body (anode body) 1, anode terminal 7, and cathode terminal 9 (resin outer body 11 is not shown). FIG. 2A and FIG. 2B each illustrate a cross-sectional view parallel to an XZ plane of solid electrolytic capacitor 20 having capacitor element 10 having a different thickness.

Solid electrolytic capacitor 20 has an outer shape that is substantially hexahedron including three opposed pair of planes as illustrated in FIG. 1, and includes capacitor element 10, resin outer body 11 enclosing capacitor element 10, anode terminal 7 and cathode terminal 9 exposed outside resin outer body 11 as illustrated by cross-sectional views of FIG. 2A and FIG. 2B. Capacitor element 10 includes porous sintered body (anode body) 1, metal lead 2 having a substantially cylindrical shape including embedded part 2a embedded in porous sintered body 1 and extended part 2b projected outside porous sintered body 1, dielectric layer 3 disposed on a surface of porous sintered body (anode body) 1, solid electrolyte layer 4 disposed on a surface of dielectric layer 3, and a cathode layer (conductive carbon layer 5 and silver paste layer 6) covering solid electrolyte layer 4.

Extended part 2b of metal lead 2 is electrically connected to anode terminal 7 by resistance welding or the like in a state where being sandwiched between an opposed pair of arm parts 7c each having an L character shape of anode terminal 7 as described below in detail (FIG. 1). Meanwhile, silver paste layer 6 of capacitor element 10 is electrically connected to cathode terminal 9 via electric conductivity adhesive 8 (e.g., mixture of thermosetting resin and metal particles) in resin outer body 11. A portion of anode terminal 7 and cathode terminal 9 is exposed from resin outer body 11, and is subjected to bending processing such that a lower surface of the portion is arranged on a same plane as a bottom surface of resin outer body 11 (see FIG. 2A and FIG. 2B).

<Porous Sintered Body (Anode Body)>

Porous sintered body (anode body) 1 has first main face 22a and second main face 22b parallel to an YZ plane, upper side face 24a and lower side face 24b parallel to an XY plane, and front end face 26a and rear end face 26b parallel to the XZ plane (FIG. 1). Porous sintered body 1 includes metal lead 2 including embedded part 2a embedded in porous sintered body 1 and extended part 2b extending in an X direction from first main face 22a as described above. Porous sintered body (anode body) 1 and metal lead 2 is formed of particles of valve metal of the same kind such as tantalum, niobium, titanium, or an alloy thereof, but the present disclosure is not limited to the valve metal particles. Here, first main face 22a and second main face 22b are examples of "a pair of main faces" of the claims, upper side face 24a and lower side face 24b are examples of "a pair of side faces" of the claims, and front end face 26a and rear end face 26b are examples of "a pair of end faces" of the claims.

Although not illustrated in the drawings in detail, porous sintered body (anode body) 1 is formed by a following process.

First, the particles of valve metal are filled in a molding space defined between a pair of first fixed mold components oppositely disposed at first main face 22a and second main face 22b of porous sintered body (anode body) 1, and between a pair of second fixed mold components oppositely disposed at front end face 26a and rear end face 26b of porous sintered body (anode body) 1.

Next, metal lead 2 is inserted into a through hole (opposing first main face 22a of porous sintered body 1) provided on one of the pair of first fixed mold components. Alternatively, the particles of valve metal may be filled in the molding space after metal lead 2 is inserted in the through hole of the first fixed mold component.

The particles of valve metal are further pressed (press molding) in a Z direction using a pair of press molding components (also referred to as "punch components") oppositely disposed at respective upper side face 24a and lower side face 24b for sintering. Accordingly, porous sintered body (anode body) 1 according to the present disclosure is subjected to press molding so as to be flattened in a direction in which the press molding components press the particles of valve metal (that is, the Z direction) and make front end face 26a and rear end face 26b narrower than upper side face 24a and lower side face 24b.

<Dielectric Layer>

Dielectric layer 3 can be formed as an oxide film by oxidizing a surface of a conductive material forming porous sintered body (anode body) 1. Specifically, metal lead 2 is welded to a carrier bar (not shown) to make porous sintered body (anode body) 1 be hanged up. Dielectric layer 3 formed of an oxide film of a valve metal can be formed on a surface of anode body 1 by immersing porous sintered body (anode body) 1 hanged up in this manner in a chemical tank (chemical device) filled with electrolyte solution (e.g., phosphoric acid aqueous solution), connecting metal lead 2 projected to an anode (not shown) of the chemical tank, connecting the electrolyte solution to a cathode of the chemical tank, and subjecting porous sintered body (anode body) 1 to anodization.

<Solid Electrolyte Layer>

Solid electrolyte layer 4 is formed to cover dielectric layer 3. Solid electrolyte layer 4 is formed of, for example, manganese dioxide, conductive polymer, or the like. Solid electrolyte layer 4 including conductive polymer is formed on dielectric layer 3 by, for example, impregnating porous sintered body (anode body) 1 on which dielectric layer 3 is formed with monomer or oligomer, and thereafter polymerizing monomer or oligomer by chemical polymerization or electrolytic polymerization. Alternatively, solid electrolyte layer 4 including conductive polymer is formed on dielectric layer 3 by impregnating porous sintered body (anode body) 1 on which dielectric layer 3 is formed with solution or dispersion of conductive polymer, and drying the porous sintered body 1. In this context, like in formation process of dielectric layer 3, solid electrolyte layer 4 may be formed on dielectric layer 3 in a state where metal lead 2 is welded to the carrier bar.

<Anode Terminal and Cathode Terminal>

Figure 3A:
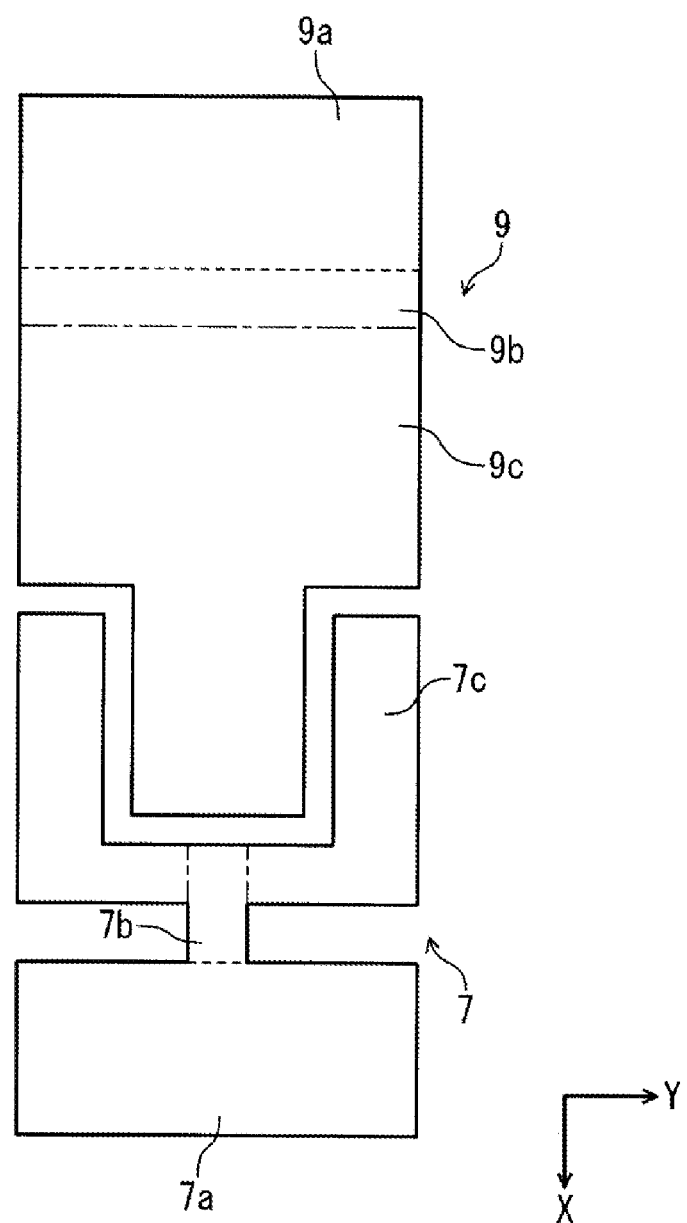
FIG. 3A is a plan view illustrating an anode terminal and a cathode terminal formed by subjecting a single metal plate to punching processing according to a first exemplary embodiment.
Figure 3B:
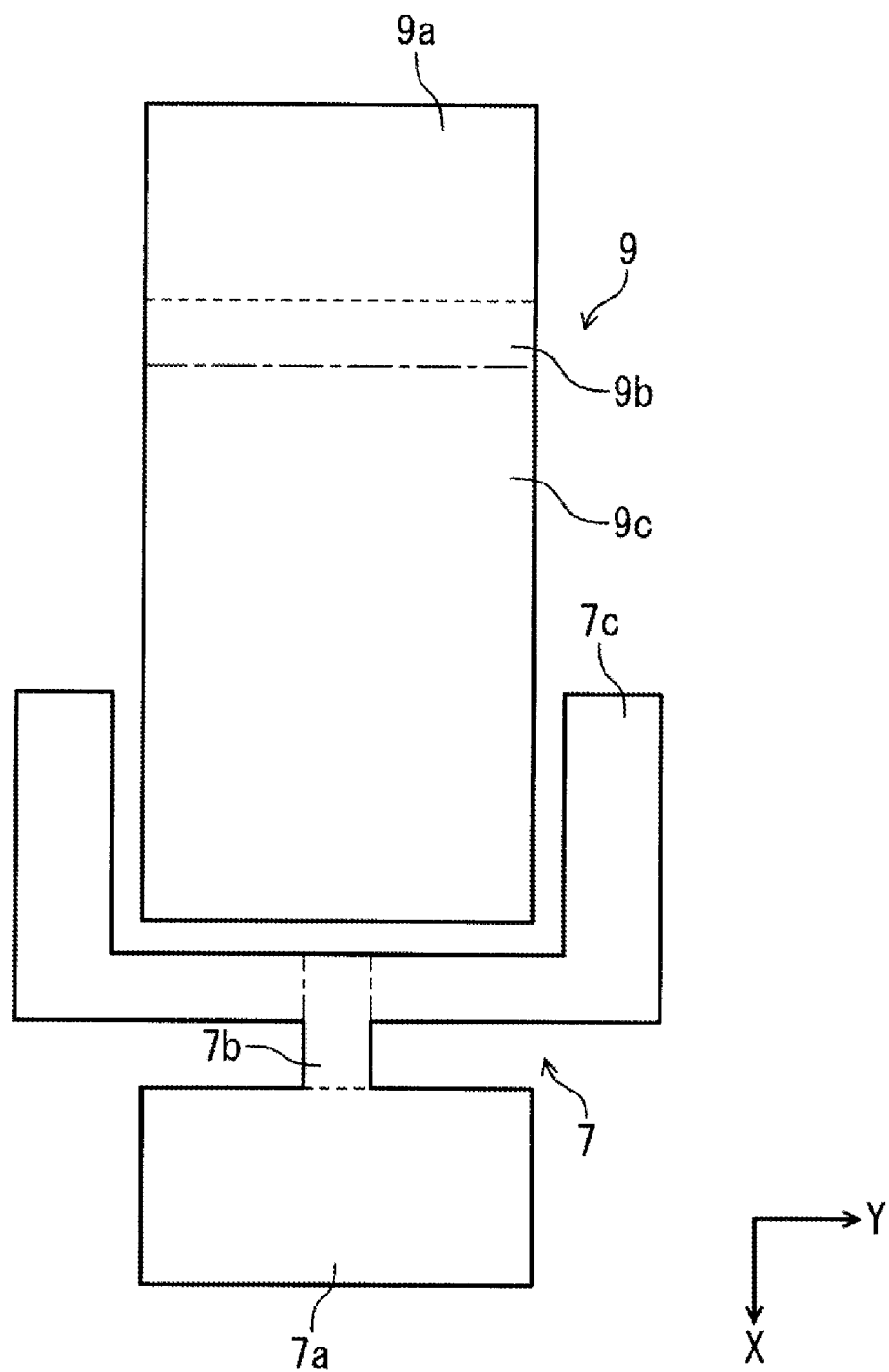
FIG. 3B is a plan view illustrating an anode terminal and a cathode terminal formed by subjecting a single metal plate to punching processing according to the first exemplary embodiment.

Anode terminal 7 and cathode terminal 9 are formed by subjecting a single metal plate to punching (press) processing. FIGS. 3A and 3B each illustrate a plan view of anode terminal 7 and cathode terminal 9 after a single metal plate is subjected to punching (press) processing. Anode terminal 7 has anode terminal mounting part 7a, anode bent part 7b, and a pair of arm parts 7c having an L character shape. Meanwhile, cathode terminal 9 has cathode terminal mounting part 9a, cathode bent part 9b, and cathode terminal connecting part 9c. Anode terminal 7 and cathode terminal 9 are folded in a valley fold along a dotted line and folded in a mountain fold along a dashed line of FIG. 3. Anode terminal mounting part 7a, anode bent part 7b, and the pair of arm parts 7c are formed in anode terminal 7. Cathode terminal mounting part 9a, cathode terminal bent part 9b, and cathode terminal connecting part 9c are formed in cathode terminal 9. Anode terminal mounting part 7a of anode terminal 7 and cathode terminal mounting part 9a of cathode terminal 9 are bent such that lower surface of anode terminal mounting part 7a and lower surface of cathode terminal mounting part 9a are arranged on the same plane as the bottom surface of resin outer body 11. Accordingly, as illustrated in FIG. 1, anode terminal mounting part 7a of anode terminal 7 extends in substantially parallel to upper side face 24a, lower side face 24b (the XY plane) of porous sintered body 1. Anode bent part 7b of anode terminal 7 extends in substantially parallel to first main face 22a, second main face 22b (the YZ plane) of porous sintered body 1. The pair of arm parts 7c having an L character shape of anode terminal 7 extend in substantially parallel to front end face 26a, rear end face 26b (the XZ plane) of porous sintered body 1. In the present application, description that "member A extends in substantially parallel to member B" denotes a configuration in which member A extends in completely parallel to member B as well as a configuration in which member A is extend in substantially parallel to member B, and a configuration in which member A is extended along member B. Specifically, the term "member A extends in substantially parallel to member B" means that an angle of a extending direction of member A with respect to member B is less than 10 degree.

Anode terminal 7 formed in this manner is electrically connected to metal lead 2 by being subjected to resistance welding to metal lead 2 in a state where metal lead 2 is sandwiched between the pair of arm parts 7c (in a state where being pressed by pair of arm parts 7c from an Y direction and a direction opposite to the Y direction) at any position in the Z direction between the pair of arm parts 7c (FIG. 1). In this context, metal lead 2 is disposed away from anode bent part 7b. And solid electrolytic capacitor 20 of a thinner type can be provided by designing a size of anode bent part 7b in the Z direction to be small.

Meanwhile, cathode terminal 9 is electrically connected to silver paste layer 6 on solid electrolyte layer 4 via electric conductivity adhesive 8 (e.g., mixture of thermosetting resin and metal particles) in resin outer body 11 (see FIG. 2A and FIG. 2B). Cathode terminal mounting part 9a and anode terminal mounting part 7a are arranged such that lower surface of cathode terminal mounting part 9a and lower surface of anode terminal mounting part 7a are arranged on the same plane as the bottom surface of resin outer body 11.

When anode terminal 7 and cathode terminal 9 are formed by subjecting a single metal plate to punching processing as illustrated in FIG. 3A, a contact area between cathode terminal connecting part 9c and silver paste layer 6 becomes smaller as a size of arm parts 7c having an L character shape of anode terminal 7 in the X direction is made larger. This causes to increase equivalent series resistance (ESR) of solid electrolytic capacitor 20. Accordingly, as illustrated in FIG. 3B, anode terminal 7 and cathode terminal 9 may be formed by expanding cathode terminal connecting part 9c to have a rectangular shape to secure a sufficient contact area between cathode terminal connecting part 9c and silver paste layer 6, alternatively.

Figure 4A:
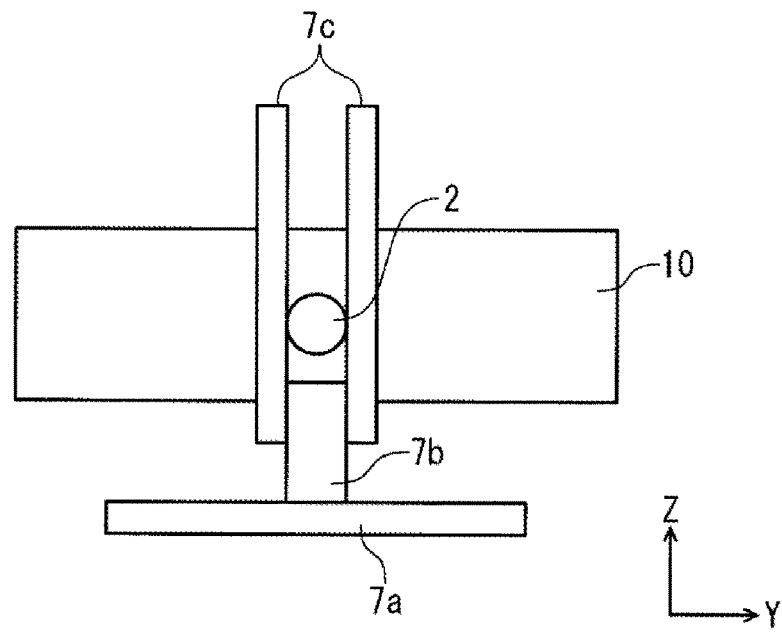
FIG. 4A is a schematic diagram illustrating the anode terminal and the capacitor element (including a metal lead) corresponding to FIG. 2A according to the first exemplary embodiment.
Figure 4B:
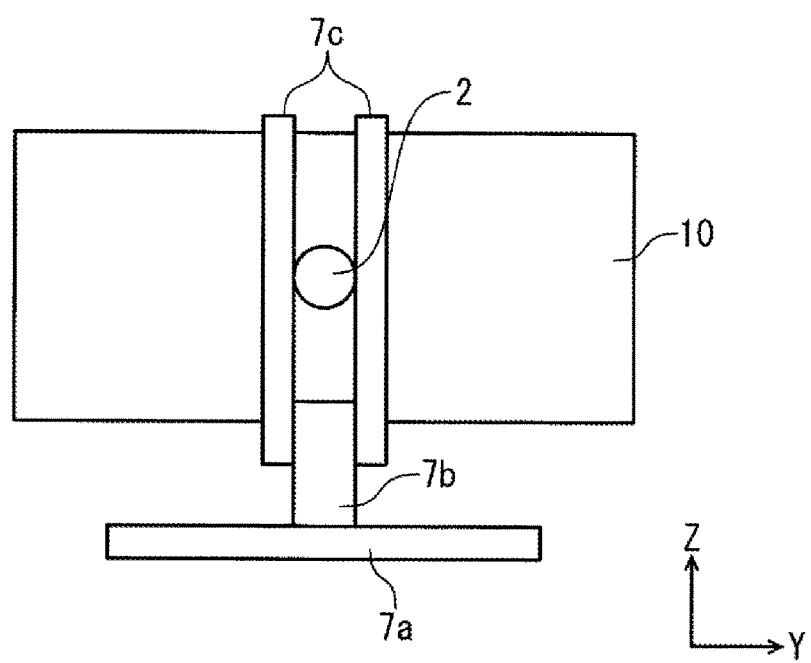
FIG. 4B is a schematic diagram illustrating the anode terminal and the capacitor element (including a metal lead) corresponding to FIG. 2B according to the first exemplary embodiment.

FIGS. 4A and 4B each illustrate a schematic diagram of anode terminal 7 and capacitor element 10 (including metal lead 2) viewed from a direction opposite to the X direction. Capacitor elements 10 illustrated in FIG. 4A and FIG. 4B correspond to capacitor elements in FIG. 2A and FIG. 2B, respectively. Both capacitor elements 10 are flattened in the Z direction, but capacitor element 10 in FIG. 4A is flattened to be thinner than capacitor element 10 of FIG. 4B. That is, solid electrolytic capacitor 20 of FIG. 2A is thinner than solid electrolytic capacitor 20 of FIG. 2B.

An anode terminal according to Unexamined Japanese Patent Publication No. 2014-204059 needs to be designed to have a different size depending on a thickness (size in the Z direction) of a capacitor element used in a solid electrolytic capacitor. In contrast, as illustrated in FIG. 2A and FIG. 2B, the present disclosure makes it possible to utilize the same anode terminal 7 and cathode terminal 9 also in a case where a thickness of capacitor element 10 (size in the Z direction) is different in accordance with electrical specifications demanded such as electrostatic capacity, that is, regardless of a position in the Z direction of metal lead 2 extended from capacitor element 10. Accordingly, a configuration of the present disclosure does not need to individually produce a punching die for manufacturing anode terminal 7 and cathode terminal 9 for each capacitor element 10 having a different thickness. Thus it is possible to reduce manufacturing cost.

Figure 10A:
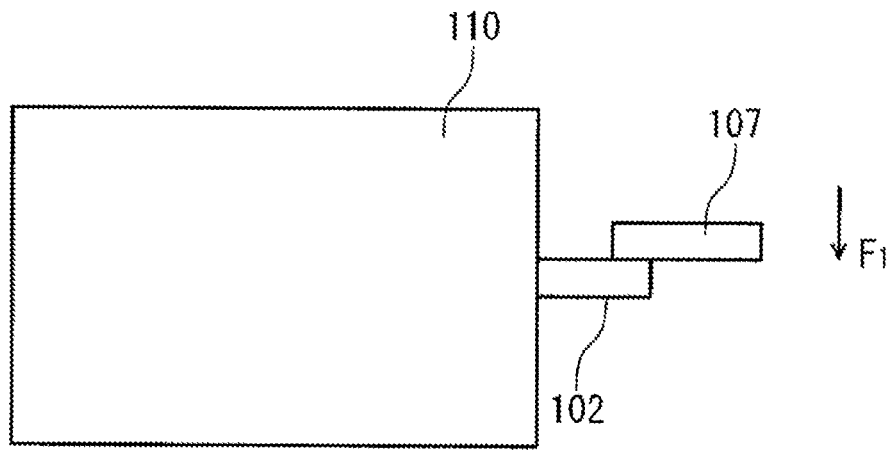
FIG. 10A is a plan view viewed from above of a capacitor element (including an anode lead) and an anode connection piece according to a conventional technique.
Figure 10B:
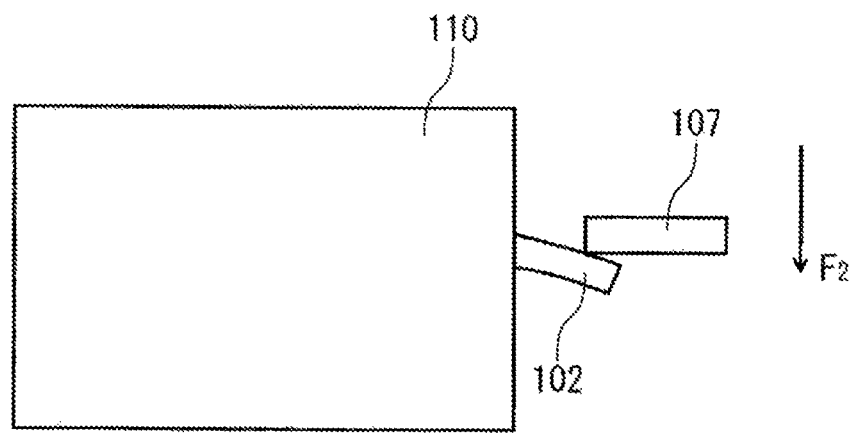
FIG. 10B is a plan view viewed from above of a capacitor element (including an anode lead) and an anode connection piece according to the conventional technique.

Also, an anode terminal according to Unexamined Japanese Patent Publication No. 2004-253615 may disadvantageously receive an excessive stress in a horizontal direction from an anode connection piece during welding to be largely bent (see FIG. 10A and FIG. 10B) to cause a crack in capacitor element 110. In contrast, according to the present disclosure, as described above, resistance welding to metal lead 2 is performed in a state where metal lead 2 is pressed from both sides in the Y direction between the pair of arm parts 7c, which prevents metal lead 2 from receiving stress from arm parts 7c in a horizontal direction during welding. Thus it is possible to substantively reduce stress.

Figure 5:
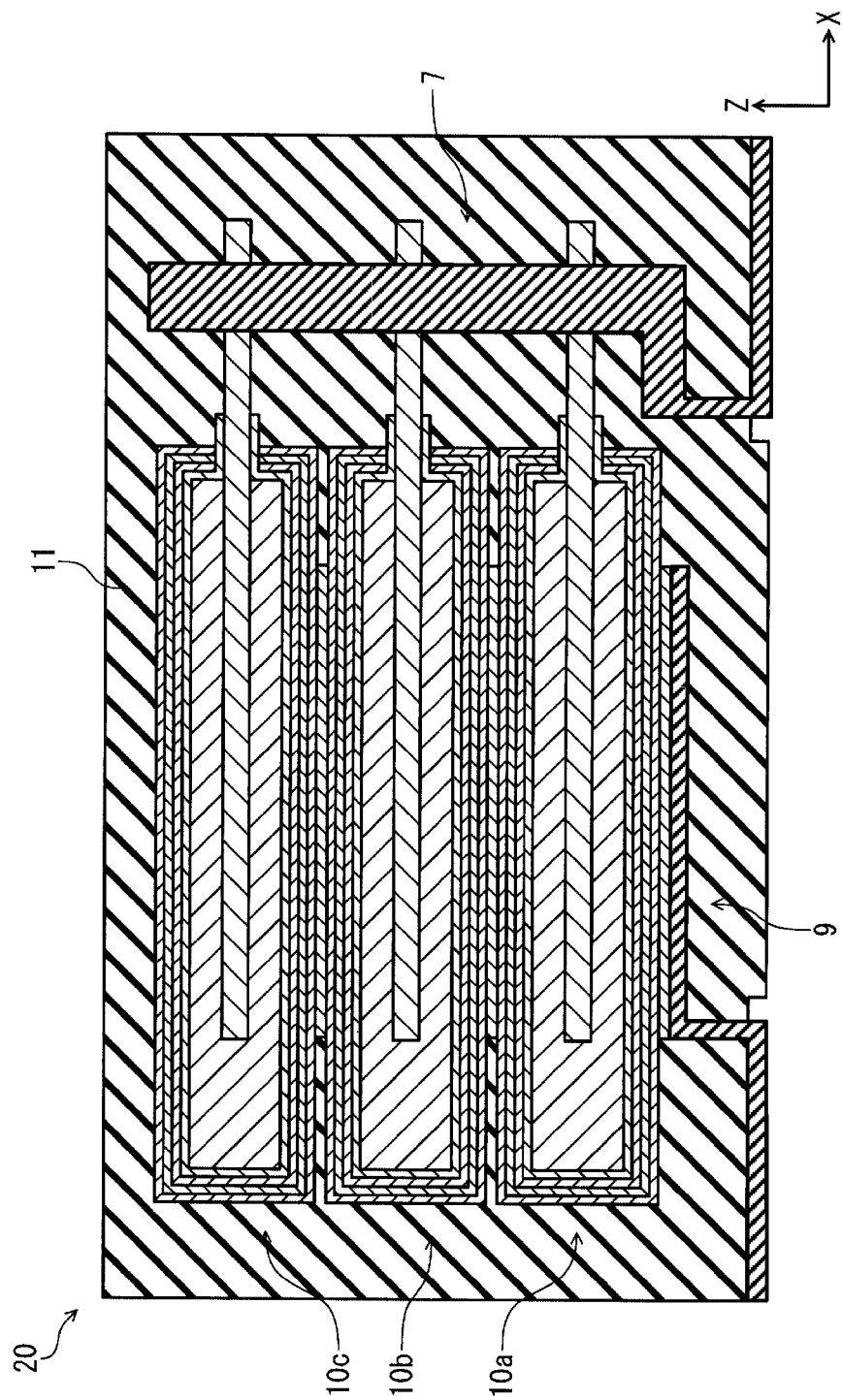
FIG. 5 is a cross-sectional view illustrating a solid electrolytic capacitor formed by laminating three capacitor elements in a Z direction, which is cut by a plan similar to the cross-sectional view of the solid electrolytic capacitor in FIGS. 2A and 2B.

FIG. 5 is a cross-sectional view illustrating solid electrolytic capacitor 20 formed by laminating three capacitor elements 10a to 10c in the Z direction like FIG. 2A. Arm parts 7c of FIG. 5 needs to be made longer than arm parts 7c of FIG. 2A, but a length of arm parts 7c can be easily adjusted by designing anode terminal 7 and cathode terminal 9 to be formed from a single metal plate like in FIG. 3B. Accordingly, the present disclosure does not need to individually produce a punching die for manufacturing anode terminal 7 and cathode terminal 9. Thus it is possible to reduce manufacturing cost. Furthermore, even when solid electrolytic capacitor 20 has a plurality of capacitor elements 10 laminated, metal leads 2 extended from respective capacitor elements 10 can be resistance welded to arm parts 7c pressing metal leads 2 in opposite directions at any positions in the Z direction. Accordingly, the present disclosure makes it possible to provide solid electrolytic capacitor 20 that is high in yield, that is, high in productivity by substantively reducing stress of each metal lead 2 received from arm parts 7c during welding.

Furthermore, irregularities may be provided on a connection surface of arm parts 7c opposed to metal lead 2 for readily positioning metal lead 2 between the pair of arm parts 7c during welding. The irregularities of the connection surface of arm parts 7c may have any shape as long as the irregularities make positioning of metal lead 2 easy, and the connection surface may be a wave shape surface or a zigzag surface formed along the Z direction, or may be a reticulation surface formed by press working.

Second Exemplary Embodiment

Figure 6:
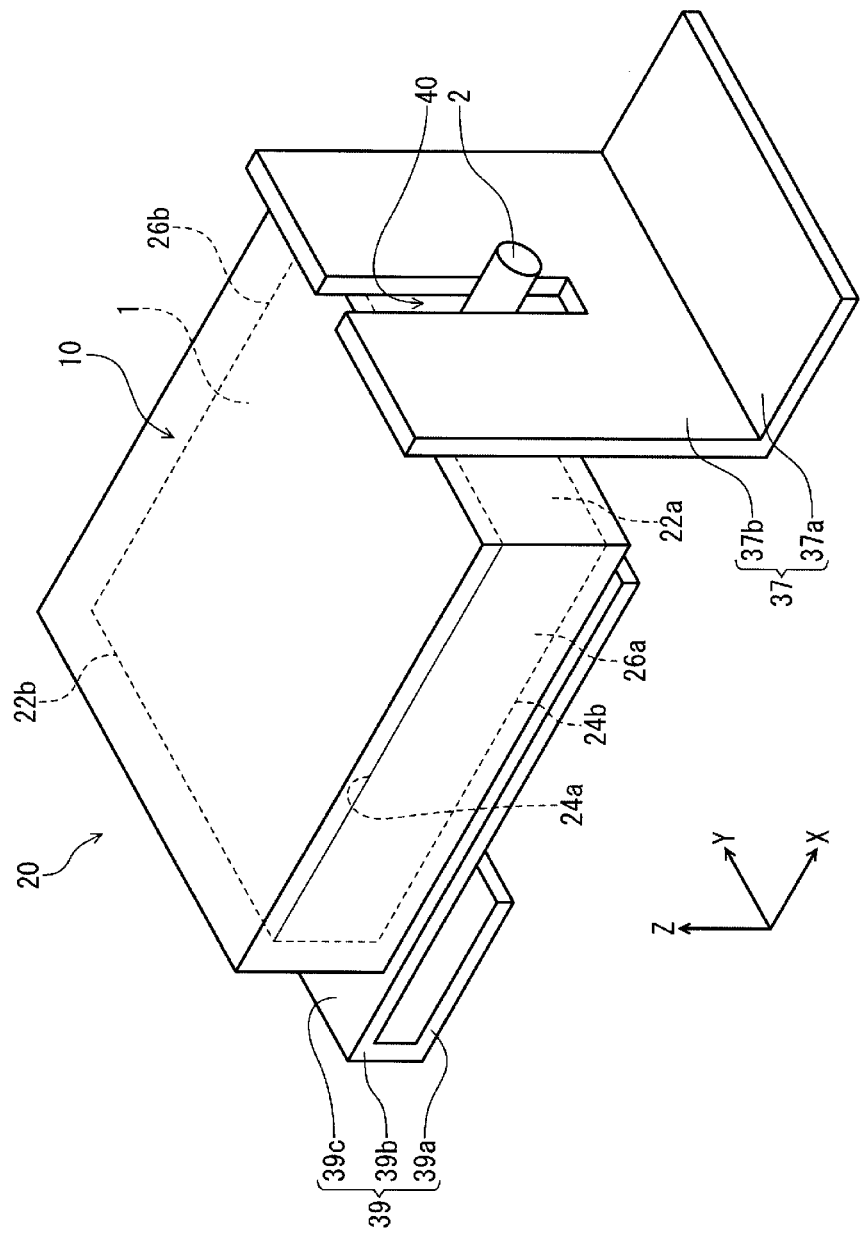
FIG. 6 is a perspective view illustrating a solid electrolytic capacitor (resin outer body is omitted) according to a second exemplary embodiment of the present disclosure.
Figure 7:
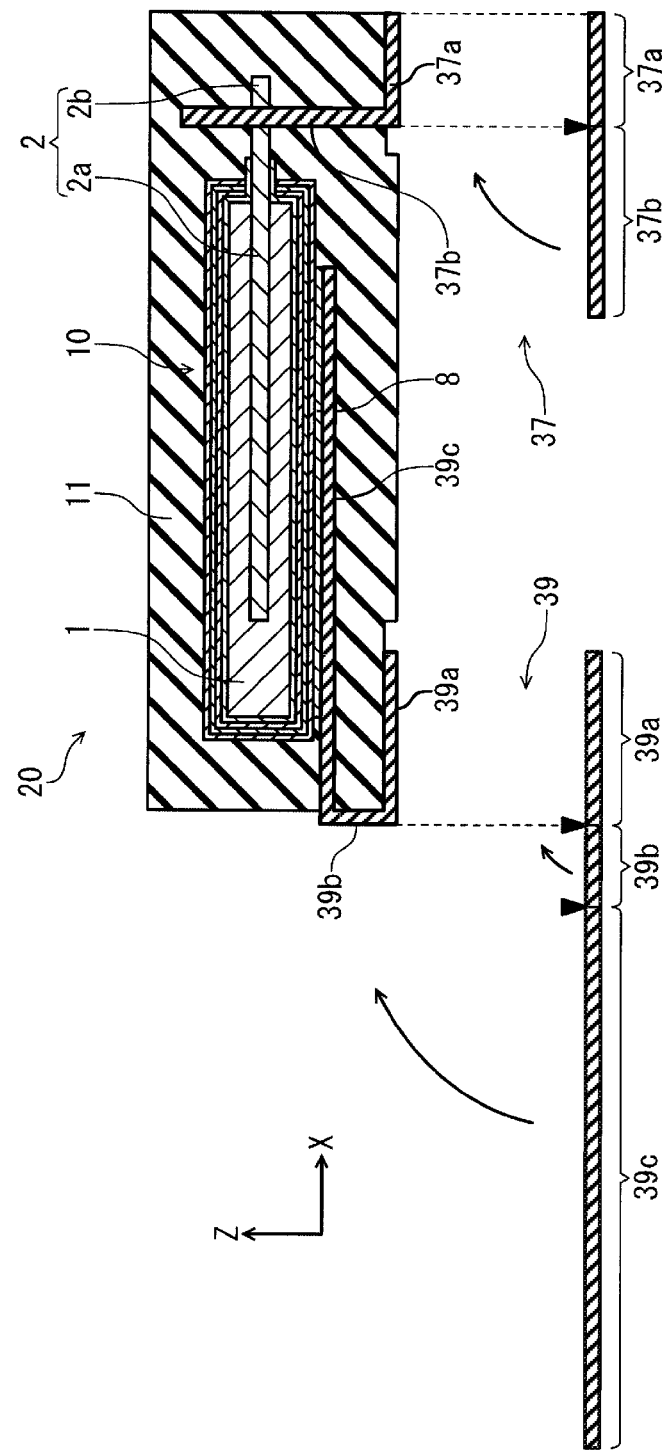
FIG. 7 is a cross-sectional view illustrating an anode terminal, a cathode terminal, and the solid electrolytic capacitor according to the second exemplary embodiment.

FIG. 6 is a perspective view illustrating solid electrolytic capacitor 20 according to a second exemplary embodiment of the present disclosure. FIG. 7 is a cross-sectional view illustrating anode terminal 37, cathode terminal 39, and solid electrolytic capacitor 20 in parallel to the XZ plane according to the second exemplary embodiment. Solid electrolytic capacitor 20 according to the second exemplary embodiment has a structure same as the structure of solid electrolytic capacitor 20 according to the first exemplary embodiment except that shape and structure of anode terminal 37 and cathode terminal 39 are different. The description of overlapping content will be omitted.

<Anode Terminal and Cathode Terminal>

Figure 8:
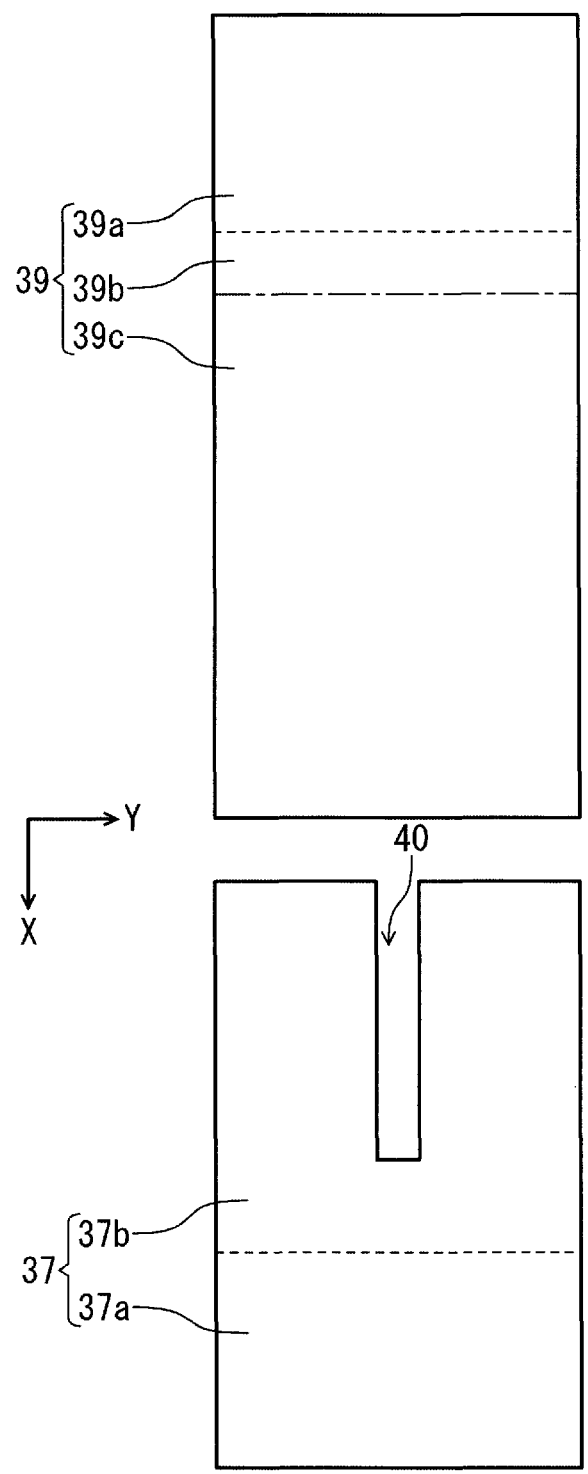
FIG. 8 is a plan view illustrating an anode terminal and a cathode terminal formed by subjecting a single metal plate to punching processing according to the second exemplary embodiment.

Anode terminal 37 and cathode terminal 39 according to the second exemplary embodiment are formed by subjecting a single metal plate to punching (press) processing like in the first exemplary embodiment. FIG. 8 is a plan view illustrating anode terminal 37 and cathode terminal 39 formed by subjecting a single metal plate to punching (press) processing. Anode terminal 37 includes anode terminal mounting part 37a and anode standing part 37b. Cathode terminal 39 includes cathode terminal mounting part 39a, cathode bent part 39b, and cathode terminal connecting part 39c. Anode terminal 37 and cathode terminal 39 are folded in a valley fold at a position of supporting point illustrated by an apex of a black triangle illustrated in FIG. 7. In this way, anode terminal mounting part 37a and anode standing part 37b are formed in anode terminal 37. And cathode terminal mounting part 39a, cathode bent part 39b, and cathode terminal connecting part 39c are formed in cathode terminal 39. Anode terminal mounting part 37a of anode terminal 37 and cathode terminal mounting part 39a of cathode terminal 39 are bent such that lower surface of anode terminal mounting part 37a and lower surface of cathode terminal mounting part 39a are disposed on the same plane as the bottom surface of resin outer body 11. Accordingly, anode terminal mounting part 37a of anode terminal 37 extends in substantially parallel to upper side face 24a, lower side face 24b (the XY plane) of porous sintered body 1. And anode standing part 37b extends in substantially parallel to first main face 22a, second main face 22b (the YZ plane) of porous sintered body 1.

Anode standing part 37b of anode terminal 37 according to the second exemplary embodiment has slot 40 extending in substantially parallel to first main face 22a, second main face 22b of porous sintered body 1 (the YZ plane) as illustrated in FIG. 6. A width of slot 40 in the Y direction is configured to be substantially equal to a diameter of metal lead 2. Thus, metal lead 2 becomes in contact with opposed connection surfaces of slot 40 when metal lead 2 is inserted into slot 40. In this manner, anode terminal 37 is electrically connected to metal lead 2 by resistance welding in a state where metal lead 2 is disposed in slot 40 at any position in the Z direction in slot 40 of anode standing part 37b (see FIG. 6). In this context, metal lead 2 is disposed at a substantially center in the Z direction of capacitor element 10, and slot 40 has a sufficient length in the Z direction, so that metal lead 2 is prevented from being in contact with a closed end of slot 40 and anode terminal mounting part 37a.

Meanwhile, cathode terminal 39 is electrically connected to silver paste layer 6 on solid electrolyte layer 4 via electric conductivity adhesive 8 (e.g., mixture of thermosetting resin and metal particles) in resin outer body 11 (see FIG. 7). Also, cathode terminal mounting part 39a and anode terminal mounting part 37a are disposed such that lower surface of cathode terminal mounting part 39a and lower surface of anode terminal mounting part 37a are disposed on the same plane as the bottom surface of resin outer body 11.

Figure 9A:
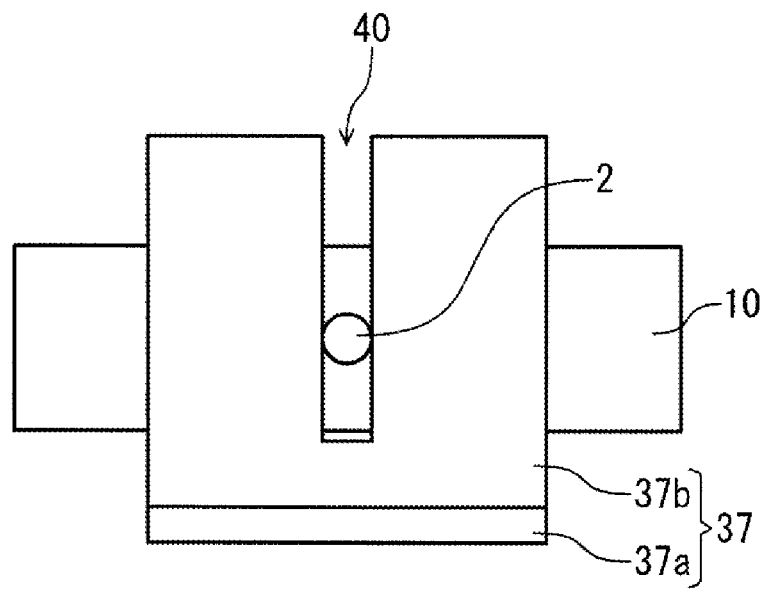
FIG. 9A is a schematic view illustrating an anode terminal and a capacitor element (including a metal lead) according to the second exemplary embodiment.
Figure 9B:
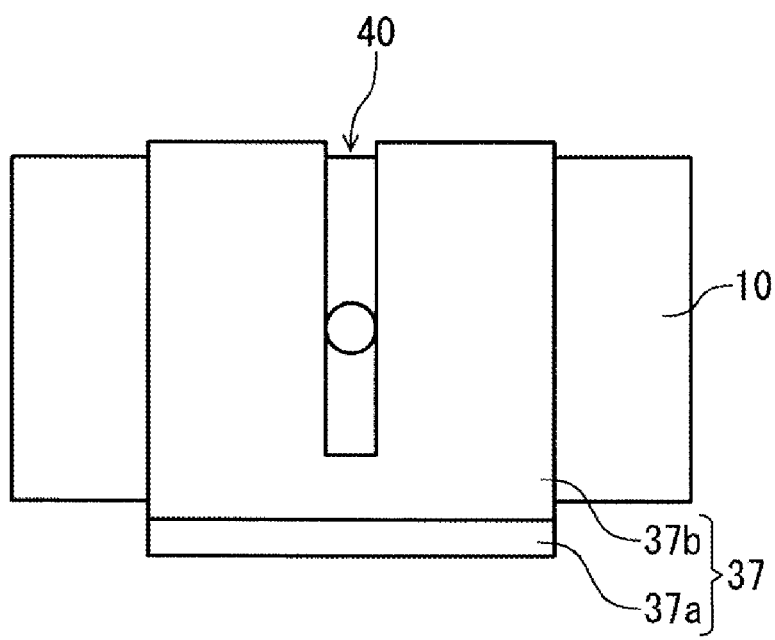
FIG. 9B is a schematic view illustrating an anode terminal and a capacitor element (including a metal lead) according to the second exemplary embodiment.

According to the second exemplary embodiment, like in the first exemplary embodiment, one or more metal leads 2 can be electrically connected to anode terminal 37 easily at any position in the Z direction of slot 40 even when a thickness of capacitor element 10 in the Z direction is changed (see FIG. 9A and FIG. 9B) or a plurality of capacitor elements 10 are laminated (not shown) in accordance with desired electrical specifications. In other words, even when the thickness of capacitor element 10 in the Z direction is changed, or a plurality of capacitor elements 10 are laminated, identical anode terminal 37 and cathode terminal 39 can be used regardless of a position of metal lead 2 in the Z direction. Accordingly, the present disclosure does not need to individually produce a punching die for manufacturing anode terminal 37 and cathode terminal 39 for each capacitor element 10 having a different thickness. Thus it is possible to produce solid electrolytic capacitor 20 with a low cost.

Furthermore, according to the second exemplary embodiment, as described above, metal lead 2 is electrically connected to slot 40 by resistance welding in a state where metal lead 2 is disposed in slot 40. Thus it is possible to eliminate or substantively reduce stress of metal lead 2 received from slot 40 during welding.

Furthermore, although cathode terminal 39 according to the second exemplary embodiment needs to be formed by using a longer metal plate as compared with cathode terminal 9 according to the first exemplary embodiment, cathode terminal 39 is advantageous in that a contact area with capacitor element 10 (its silver paste layer 6) can be increased as illustrated in FIG. 7.

The present disclosure enables an identical anode terminal and cathode terminal to be used to assemble solid electrolytic capacitors having various thicknesses.

What is claimed is:

1. A solid electrolytic capacitor comprising:
   at least one porous sintered body having a pair of main faces opposed to each other, a pair of side faces opposed to each other, and a pair of end faces opposed to each other;
   a metal lead partly embedded in the at least one porous sintered body, the metal lead extending from one of the pair of main faces;
   a dielectric layer disposed on a surface of the at least one porous sintered body;
   a solid electrolyte layer disposed on the dielectric layer;
   a first terminal electrically connected to the metal lead; and
   a second terminal electrically connected to the solid electrolyte layer, wherein:
   the first terminal includes a first terminal mounting part, a pair of arm parts opposed to each other, and a bent part disposed between the first terminal mounting part and the pair of arm parts, the first terminal mounting part extending in substantially parallel to each of the pair of side faces, the pair of arm parts extending in substantially parallel to each of the pair of end faces,
   the second terminal includes a terminal connecting part and a second terminal mounting part, the terminal connecting part being electrically connected to the solid electrolyte layer, the second terminal mounting part extending in substantially parallel to each of the pair of side faces,
   the metal lead is in direct contact with each of the pair of arm parts while being sandwiched between the pair of arm parts, and is electrically connected to each of the pair of arm parts, and
   a gap between the pair of arm parts is configured to be uniform so that the metal lead sandwiched between the pair of arm parts is in direct contact with each of the pair of arm parts at any position in an extending direction of the pair of arm parts.

2. The solid electrolytic capacitor according to claim 1, wherein the metal lead is disposed away from the bent part of the first terminal.

3. The solid electrolytic capacitor according to claim 1, wherein:
   the pair of arm parts of the first terminal have a pair of connection surfaces opposed to each other, each of the pair of connection surfaces being connected to the metal lead, and
   the each of the pair of connection surfaces has irregularities.

4. The solid electrolytic capacitor according to claim 1, wherein
   the at least one porous sintered body includes a plurality of the porous sintered bodies.

5. The solid electrolytic capacitor according to claim 1, wherein an area of the pair of end faces is smaller than an area of the pair of side faces.

6. The solid electrolytic capacitor according to claim 1, wherein the metal lead is welded to each of the pair of arm parts while being sandwiched between the pair of arm parts.

7. The solid electrolytic capacitor according to claim 1, wherein each of the pair of arm parts has an L shape.

8. The solid electrolytic capacitor according to claim 1, wherein each of the pair of arm parts has an L shape, wherein the L shape includes a short arm and a long arm, and the metal lead is in direct contact with the long arm.

* * * * *